United States Patent
Meyer et al.

(10) Patent No.: US 10,354,331 B2
(45) Date of Patent: Jul. 16, 2019

(54) RECEIVING AND PROCESSING TRANSACTION REQUESTS USING A DISTRIBUTOR PORTAL

(71) Applicant: Bank of America Corporation, Charlotte, NC (US)

(72) Inventors: Timothy A. Meyer, Jacksonville, FL (US); Tracy E. Higgins, Saint Augustine, FL (US); Karen M. Slayton, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 1026 days.

(21) Appl. No.: 14/808,049

(22) Filed: Jul. 24, 2015

(65) Prior Publication Data

US 2015/0339779 A1 Nov. 26, 2015

Related U.S. Application Data

(63) Continuation of application No. 12/840,994, filed on Jul. 21, 2010, now abandoned.

(51) Int. Cl.
*G06Q 40/00* (2012.01)
*G06Q 40/08* (2012.01)
*G06Q 10/10* (2012.01)

(52) U.S. Cl.
CPC ............. *G06Q 40/08* (2013.01); *G06Q 10/10* (2013.01)

(58) Field of Classification Search
CPC ..................................................... G06Q 40/08
USPC ................................................ 705/4, 35–45
See application file for complete search history.

(56) References Cited

U.S. PATENT DOCUMENTS

| | | | | |
|---|---|---|---|---|
| 2002/0116311 A1* | 8/2002 | Chalke | ................... | G06Q 40/04 705/36 R |
| 2002/0156657 A1* | 10/2002 | de Grosz | ............... | G06Q 10/10 705/4 |
| 2003/0004844 A1 | 1/2003 | Hueler | | |
| 2003/0023531 A1* | 1/2003 | Fergusson | .............. | G06Q 10/10 705/36 R |

(Continued)

OTHER PUBLICATIONS

Google Search, (<https://www.google.com/search?q=how+to+request+a+change+to+an+annuity+contract&rls=com.microsoft%3Aen-us%3AIEAddress&> source=lnt&tbs=cdr%3A 1 %2Ccd_min%3A 1 %2F1 %2F1999%2Ccd_max%3A7%2F20%2F2009&tbm=) [Jan. 1, 1999-Jul. 20, 2009], 2 pages.

(Continued)

*Primary Examiner* — Chia-Yi Liu
(74) *Attorney, Agent, or Firm* — Banner & Witcoff, Ltd.; Michael A. Springs

(57) ABSTRACT

A method of initiating and processing an annuity transaction request according to a messaging protocol that uses entirely electronic forms of communication is provided. Upon receiving an annuity transaction request at a distributor portal associated with an annuity distribution entity, from an individual associated with the annuity, the distributor portal collects information relevant to the annuity transaction request, such as details about the annuity contract and the particular type of transaction request, and transmits the transaction request to a carrier of the annuity. The receiving, collecting, processing and transmitting is conducted entirely by the distributor portal, which facilies the exchange of electronic communications between the different parties involved.

14 Claims, 7 Drawing Sheets

(56) References Cited

U.S. PATENT DOCUMENTS

2007/0118447 A1    5/2007   Caballero et al.
2008/0133324 A1    6/2008   Jackson et al.
2009/0271224 A1   10/2009   Lange

OTHER PUBLICATIONS

Apr. 24, 2015 U.S. Final Office Action—U.S. Appl. No. 12/840,994.
Oct. 1, 2014 U.S. Non-Final Office Action—U.S. Appl. No. 12/840,994.
Nov. 19, 2012 U.S. Final Office Action—U.S. Appl. No. 12/840,994.
May 9, 2012 U.S. Non-Final Office Action—U.S. Appl. No. 12/840,994.

* cited by examiner

RECEIVING AND PROCESSING TRANSACTION REQUESTS USING A DISTRIBUTOR PORTAL

CROSS-REFERENCE TO RELATED APPLICATIONS

This application claims the benefit of and is a continuation of U.S. patent application Ser. No. 12/840,994, filed Jul. 21, 2010, and entitled "Annuity Maintenance Messaging Protocol," which is incorporated by reference herein in its entirety.

FIELD

Aspects of the disclosure relate to communicating a transaction request. More specifically, aspects of the disclosure relate to sending and receiving electronic communications during the initiation and processing of an annuity transaction request.

BACKGROUND

Many organizations, such as large multinational financial institutions, maintain as part of their portfolio of wealth management services the ability to distribute retirement investment products, such as annuities issued by insurance companies. Accordingly, one or more divisions of a financial institution may be comprised of sales forces licensed to sell insurance related products to consumers. The individuals (e.g., financial advisors or agents) comprising these sales forces typically meet with interested consumers, draft necessary documents for the consumers, and then send the documents to the appropriate insurance carriers, which are the entities or companies that actually issue the insurance contracts to the desiring consumers.

Annuities are one type of insurance product commonly sold to consumers by an insurance distribution company or division of a larger company involved in wealth management and/or investment services. In simple terms, an annuity is a contract between a consumer (the insured) and an insurance carrier or company (the insurer), under which the consumer makes a lump-sum payment or series of payments to the carrier and in return the insurance carrier agrees to make periodic payments to the consumer beginning immediately or at some future date. Once such a policy has been issued, any time that a financial advisor, insurance distribution company, carrier or customer associated with the policy wishes to make a change to the underlying contract, the desired change must be requested and authorized over the telephone or in writing, often including multiple communication exchanges between the various entities or parties involved.

The rapid pace of today's digital world has transformed the nature of business-to-business interactions such that nearly all communications passed between different entities associated with a transaction are in electronic form. The numerous communications involved in initiating and processing a change to an existing annuity should similarly be conducted electronically.

BRIEF SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One or more aspects described herein relate to providing a system that supports multiple different types of annuity transactions according to a messaging protocol that uses entirely electronic forms of communication. Examples of the types of annuity transactions supported by such a system include funds transfers, partial withdrawals, account number changes, rebalancing between different accounts, allocation of assets among different accounts, recurring allocations and other similar transaction types.

One or more aspects described herein relate to a distributor portal (e.g., a computer) of an annuity distribution entity facilitating the exchange of communications between an individual associated with an annuity contract and a carrier of the annuity contract. The distributor portal receives annuity transaction requests from individuals associated with annuity contracts, collects information relevant to the contracts and the requests, and transmits the transaction requests to the carriers for processing.

One or more other aspects described herein relate to the distributor portal receiving back from the carriers, once the transaction requests have been processed, the results of the transaction requests (e.g., approval/denial of the requests). The distributor portal then updates a status of the pending transaction requests, which are made available to the individuals who requested the transactions.

Aspects of the disclosure may be provided in a computer-readable medium having computer-executable instructions to perform one or more of the process steps described herein.

This summary is provided to introduce a selection of aspects of the disclosure in a simplified form that are further described below in the Detailed Description and accompanying figures. The summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects described herein relate to initiating and processing multiple different types of annuity (e.g., contract, insurance policy, insurance agreement, or the like) transaction requests according to a messaging protocol that uses entirely electronic forms of communication. Upon receiving an annuity transaction request (e.g., a request to make a change to an existing annuity contract) from an individual associated with the annuity, a distributor of the annuity (e.g., an annuity distribution entity, insurance policy distributor, contract distribution entity, or the like) collects information relevant to the annuity transaction request, such as details about the annuity contract and the particular type of transaction request, and transmits the transaction request to a carrier of the annuity (e.g., an annuity issuing entity, insurance issuing entity, policy carrier, insurance carrier, or the like). The receiving, collecting and transmitting by the distributor is conducted entirely by a distributor portal, which facilities the exchange of electronic communications between the different parties involved.

Examples of the different types of annuity transactions that may be processed according to aspects of the messaging protocol further described herein include funds transfers, partial withdrawals, account number changes, rebalancing between different accounts, allocation of assets among different accounts, recurring allocations, systematic annuity withdrawals, dollar cost averaging, and the like.

One or more other aspects described herein relate to providing an annuity transaction request portal capable of routing transactions to multiple different destinations. For example, depending on a particular carrier or product, some transactions may have to be routed to an external carrier, while other transactions may need to be routed to internal administration systems. In one arrangement, transactions routed to external carriers may be routed via various web services.

Figure 1:
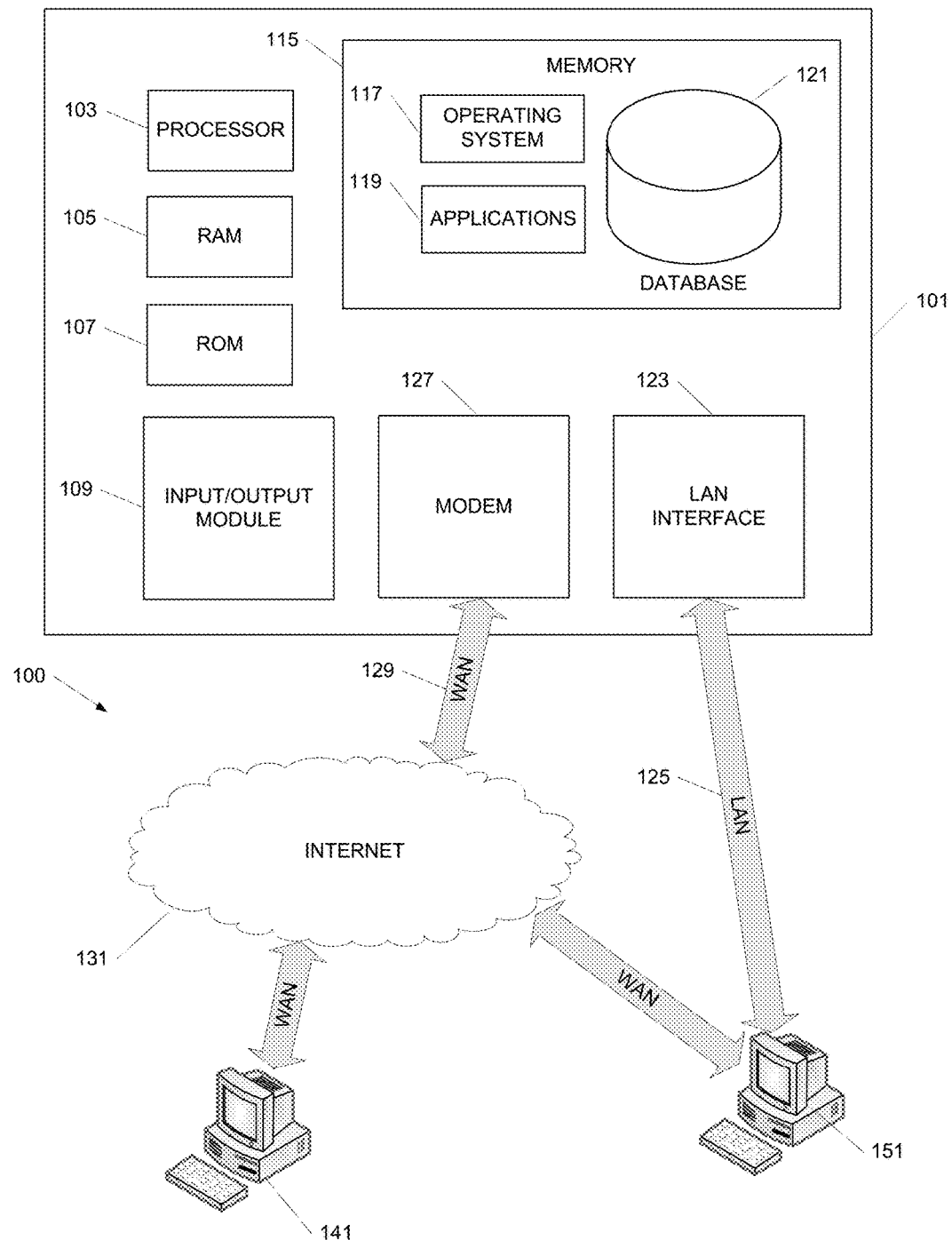
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

Server 101 may operate in a networked environment 100 supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. Furthermore, any of a number of different communication protocols, such as TCP/IP, Ethernet, FTP, HTTP and the like, may be used within networked environment 100.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, or the like, that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
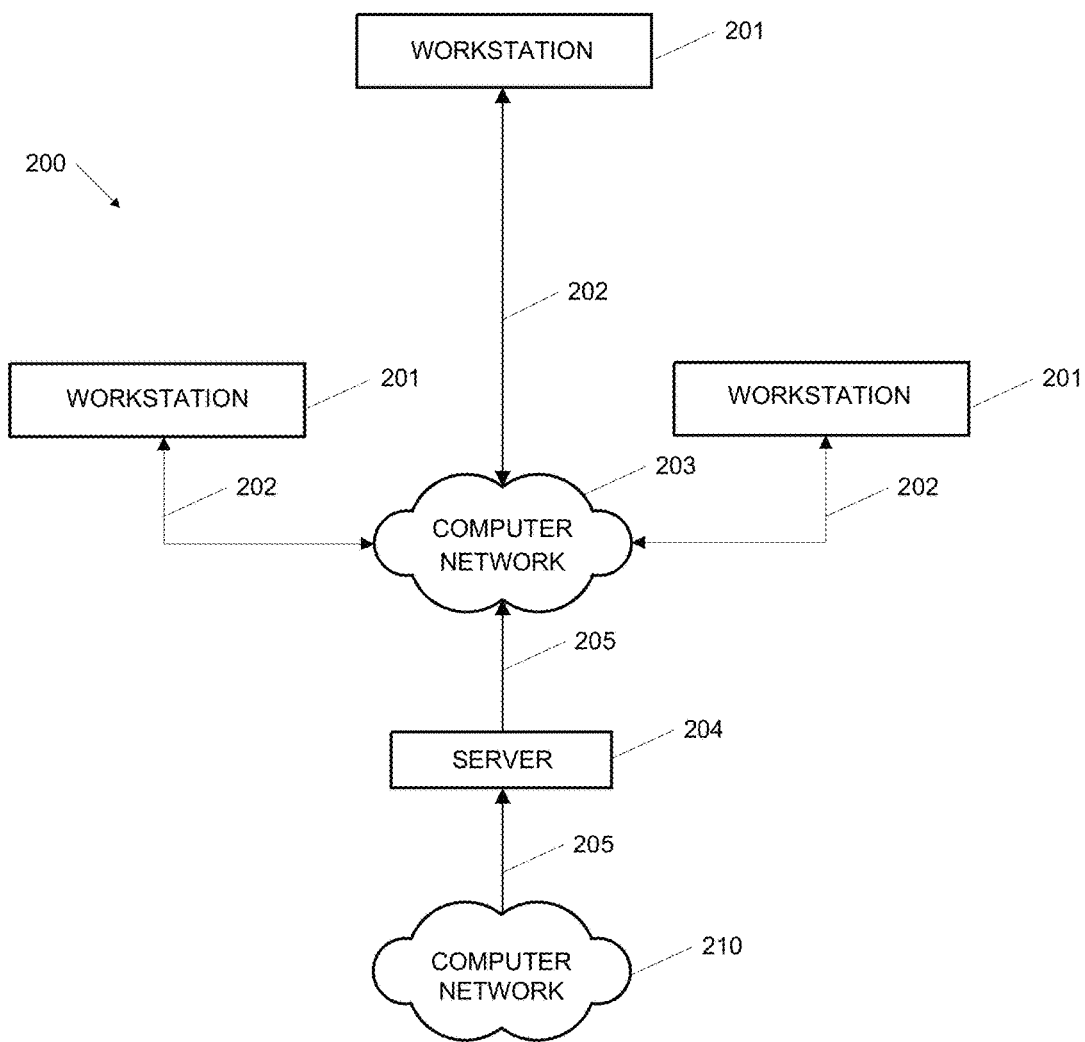
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, or the like.

The steps that follow in the Figures may be implemented by one or more of the components in FIGS. 1 and 2 and/or other components, including other computing devices.

Figure 3:
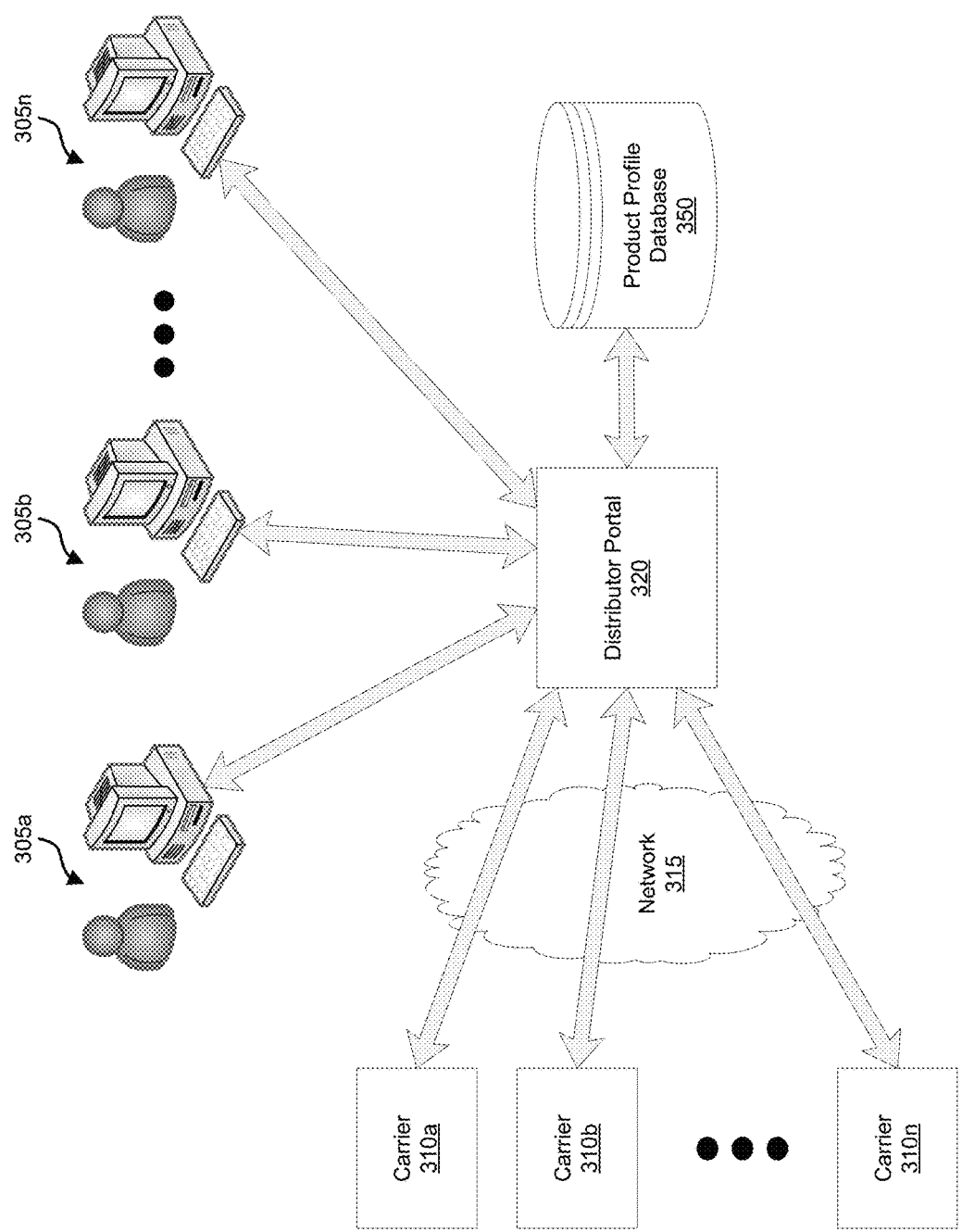
FIG. 3 is a schematic diagram showing example communication paths between different entities involved in a contract transaction request according to one or more aspects described herein.

FIG. 3 illustrates an example network environment in which information may be communicated between the different entities involved in the annuity contract transaction request. As shown in FIG. 3, distributor portal 320, which in one or more arrangements is a computer (e.g., server, processor, or the like) associated with an annuity distribution entity, allows for communication with carriers 310a through 310n (where "n" is an arbitrary number) over network 315. In at least one arrangement, carriers 310a through 310n are entities providing or issuing annuity contracts that are distributed to consumers by the annuity distribution entity. Network 315 may be, for example, the Internet, a virtual private network (VPN), or other similar network capable of carrying electronic communications between distributor portal 320 and carriers 310a through 310n. Similar to distributor portal 320, carriers 310a through 310n may include computers or other such processing devices capable of transmitting and receiving electronic communications over network 315. Also shown in FIG. 3 are users 305a through 350n (where "n" again an arbitrary number), which, in at least one arrangement, include agents associated with the annuity distribution entity operating distributor portal 320 who may initiate and submit annuity transaction requests via distributor portal 320 on behalf of customers of the annuity distribution entity. For example, users 305a through 305n may include financial advisors, sales representatives and/or other similar individuals of the annuity distribution entity associated with distributor portal 320. In other arrangements, users 305a through 305n may also include customers of the annuity distribution entity, agents acting on behalf of such customers and/or other individuals authorized to initiate transaction requests for such customers.

As will be described in greater detail below, users 305a through 305n and carriers 310a through 310n may have bidirectional communication with the annuity distribution entity via distributor portal 320, such that information may be electronically transmitted between the different parties in a quick, easy and secure manner. For example, instead of a financial advisor (e.g., user 305a) associated with the annuity distribution entity calling a carrier (e.g., carrier 310a) for authorization to make a change to an existing annuity contract of the carrier on behalf of a customer associated with the contract, and then waiting to receive written confirmation of the of the request from the carrier, the financial advisor may instead communicate such a transaction request to the carrier via distributor portal 320. Additionally, the result of the transaction request, as well as, the results of numerous other transaction requests submitted to carriers 310a through 310n at a similar time, may be electronically transmitted from the carriers to distributor portal 320, which may process the results and make them centrally available to users 305a through 305n.

FIG. 3 also includes product profile database 350, which may be utilized in conjunction with distributor portal 320 to store and retrieve various items of information received from carriers 310a through 310n. For example, product profile database 350 may store information related to the types of transaction requests that may be submitted by users 305a through 305n via distributor portal 320. In one arrangement, a user 305a of distributor portal 320 may wish to initiate a transaction request for a particular annuity contract provided by carrier 310a to a customer of the entity associated with distributor portal 320. Upon entering certain information identifying the particular annuity contract into distributor portal 320, distributor portal 320 may retrieve product profile information about the specific contract type involved from product profile database 350. This profile information may be used by distributor 320 to present the available transactions that may be requested by user 305a. For example, referring to FIG. 7, if a user (e.g., user 305a) of distributor portal 320 selects "Contract #1" from among the various contracts listed for a particular customer account and Contract #1 is a "Product Type A" product of a certain carrier (e.g., carrier 310a), then distributor portal 320 may retrieve profile information for Product Type A from product profile database 350. In one arrangement, such product profile information is transmitted from carriers 310a through 310n to distributor portal 320 independently of any transaction request being made within distributor portal 320. For example, carriers 310a through 310n may send product profile information to distributor portal 320 on a daily, weekly, monthly, or other periodic basis such that distributor portal has stored within product profile database 350 updated product information for all products of carriers 310a through 310n distributed by the entity (e.g., insurance distribution entity) associated with distributor portal 320. In another arrangement, product profile information may be transmitted from carriers 310a through 310n to distributor portal 320 once a transaction request has been made. It is to be understood that product profile information may be transmitted from carriers 310a through 310n to distributor portal 320 in other ways in addition to or instead of those described above. Continuing with the above example, distributor portal 320 may retrieve product profile information for Product Type A from product profile database 350 for use in presenting user 305a with a list 715 of available transactions that may be requested for Contract #1. Similarly, if user 305a selects "Contract #2," distributor portal 320 may retrieve product profile information for Product Type B from the product profile database 350 and present the user with a list of available transactions 710 for Product Type B.

Figure 4:
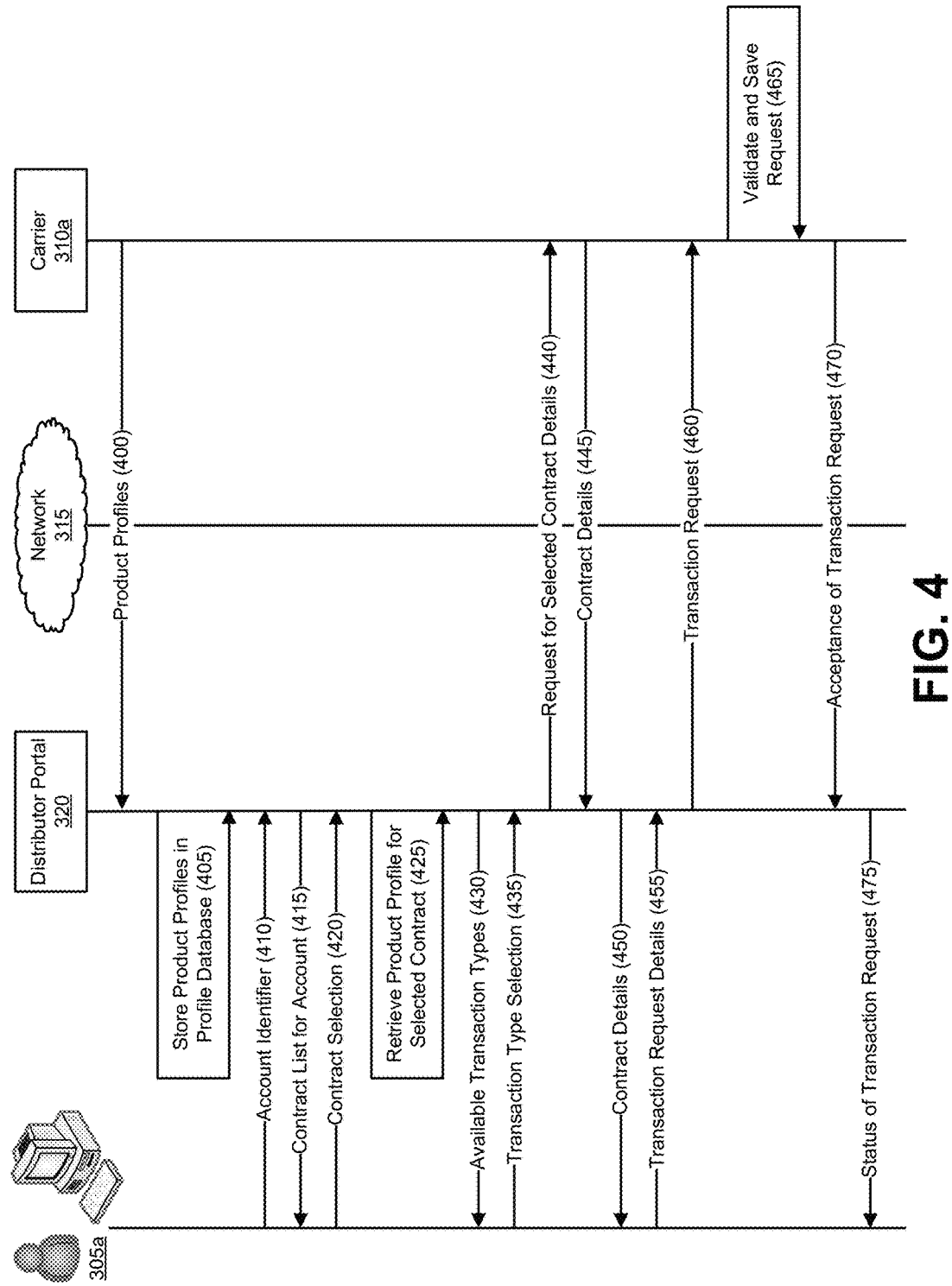
FIG. 4 illustrates an example information flow diagram showing communications during a first stage of processing a contract transaction request according to one or more aspects described herein.

FIG. 4 is an example flow of communications between the different parties described above during a first stage of processing an annuity transaction request. As illustrated, a carrier (e.g., carrier 310a shown in FIG. 3) may send to distributor portal 320 product profiles 400 for any or all products that are sold to consumers by the annuity distribution entity associated with distributor portal 320. As discussed above, when distributor portal 320 receives product profile information from carrier 310a, distributor portal 320 may store such profile information in a product profile database (e.g., product profile database 350 shown in FIG. 3) associated with distributor portal 320 (line 405). A user of distributor portal 320 (e.g., user 305a shown in FIG. 3) submits or enters an account identifier 410 to distributor portal 320. For example, a user may enter an account number of a particular account of the annuity distribution entity, which distributor portal 320 may use to identify the account and provide to the user a list of contracts 415 associated with the account. The contract list 415 provided to the user may include a single contract or may include multiple contracts. For example, an annuity distribution entity may offer retirement contracts that earn interest at different rates and/or provide different benefits, one or more of which a particular account may be associated with.

From the list of contracts 415 provided, the user sends to distributor portal 320 a selected contract 420, which distributor portal 320 identifies as being of a certain contract type and retrieves product profile information for (line 425). In at least one arrangement, distributor portal 320 retrieves product profile for the selected contract type from the product profile database in which profile information was previously stored in line 405. Distributor portal 320 provides the user with a list of available transactions 430 that may be requested for the selected contract 420 sent to distributor portal 320. For example, referring again to FIG. 7, the user may be presented with a list of available transactions 715 for Product Type A or a list of available transactions 710 for Product Type B, depending on the contract selected from the contract list for the associated account. Referring back to FIG. 4, the user may send to distributor portal 320 a selection of one of the available transactions 435 for the contract.

After the distributor portal 320 receives the user's selection of a particular type of transaction 435, the flow of communications between distributor portal 320 and carrier 310a continues with distributor portal 320 sending a request for details about the selected contract 440 to carrier 310a, to which carrier 310a sends back a response including the details (line 445). The contract details 445 received by distributor 320 from carrier 310a are formatted by distributor 320 and provided to the user. In at least one arrangement, the contract details 445 received by distributor 320 from carrier 310a are used by distributor 320 together with product profile information 425 retrieved by distributor 320 from the product profile database such that the user is presented with a particular transaction details page 450. Distributor 320 receives back from the user the transaction details 455, and passes such details to carrier 310a in the form of a transaction request 460. The transaction details 455 received by distributor 320 from the user may include details related to the change and/or transaction that the user wishes to make to the selected contract 420, which distributor 320 then formats into an electronic transaction request 460 that is transmitted over network 315 to carrier 310a.

Figure 5:
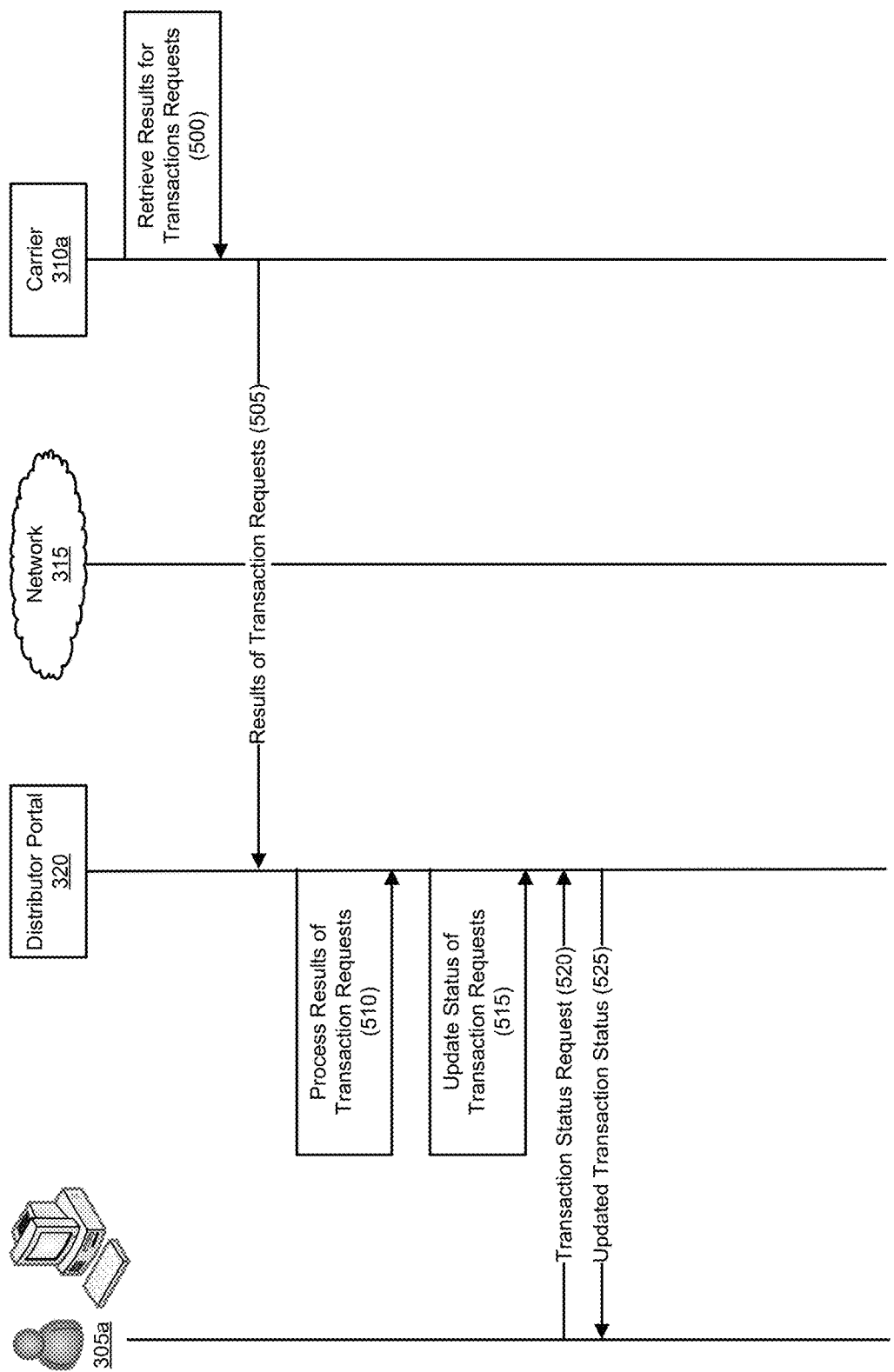
FIG. 5 illustrates an example information flow diagram showing communications during a second stage of processing a contract transaction request according to one or more aspects described herein.

Carrier 310a may validate the received transaction request from distributor portal 320 and save the request for processing (line 465), which normally occurs overnight and is referred to as "Day 2 Processing." Day 2 processing and the communications that occur as part thereof are described in greater detail below with reference to FIG. 5. Following receipt and validation of the transaction request (lines 460 and 465), carrier 310a may transmit back to distributor portal 320 an acceptance of the transaction request 470. The acceptance of the transaction request 470 sent from carrier 310a to distributor portal 320 may be in a variety of different forms of responses to the received transaction request 460, such as a notification of acceptance, confirmation receipt, or the like. After receiving the acceptance of the request from carrier 310a, distributor portal 320 provides the user with a status of the transaction request 475.

In at least one arrangement, the flow of communications illustrated in FIG. 4 occur during a first part or stage of the transaction request processing, which may be referred to herein as "Day 1 Processing." As described above, carrier 310a validates and saves the transaction request in line 465 of FIG. 4 so that the request may be processed overnight by the carrier, which, in at least one arrangement is the annuity issuing entity. Referring now to FIG. 5, illustrated are the flows of communications between the various entities, including the annuity distribution entity (e.g., distributor portal 320), the user (e.g., user 305a) and the annuity issuing entity (e.g., carrier 310a), during the second stage or part of the processing of the transaction request (e.g., "Day 2 Processing").

The communications comprising the Day 2 Processing include carrier 310a retrieving the results 500 of the transaction requests from the Day 1 Processing, which may be arrived at or generated by the annuity issuing entity in any number of ways. The carrier 310a transmits the results of the Day 1 Processing transaction requests 505 to distributor portal in a format that allows distributor portal to process the results 510 and update a status 515 of each pending transaction request. The user of distributor portal 320 may send a request 520 for the status of the transaction request submitted during the Day 1 Processing, to which distributor portal 320 may respond by making available to the user the updated status of the transaction request 525. Examples of a possible updated status of a transaction request include "still pending," "denied," "approved," "higher level review required," and the like.

Figure 6:
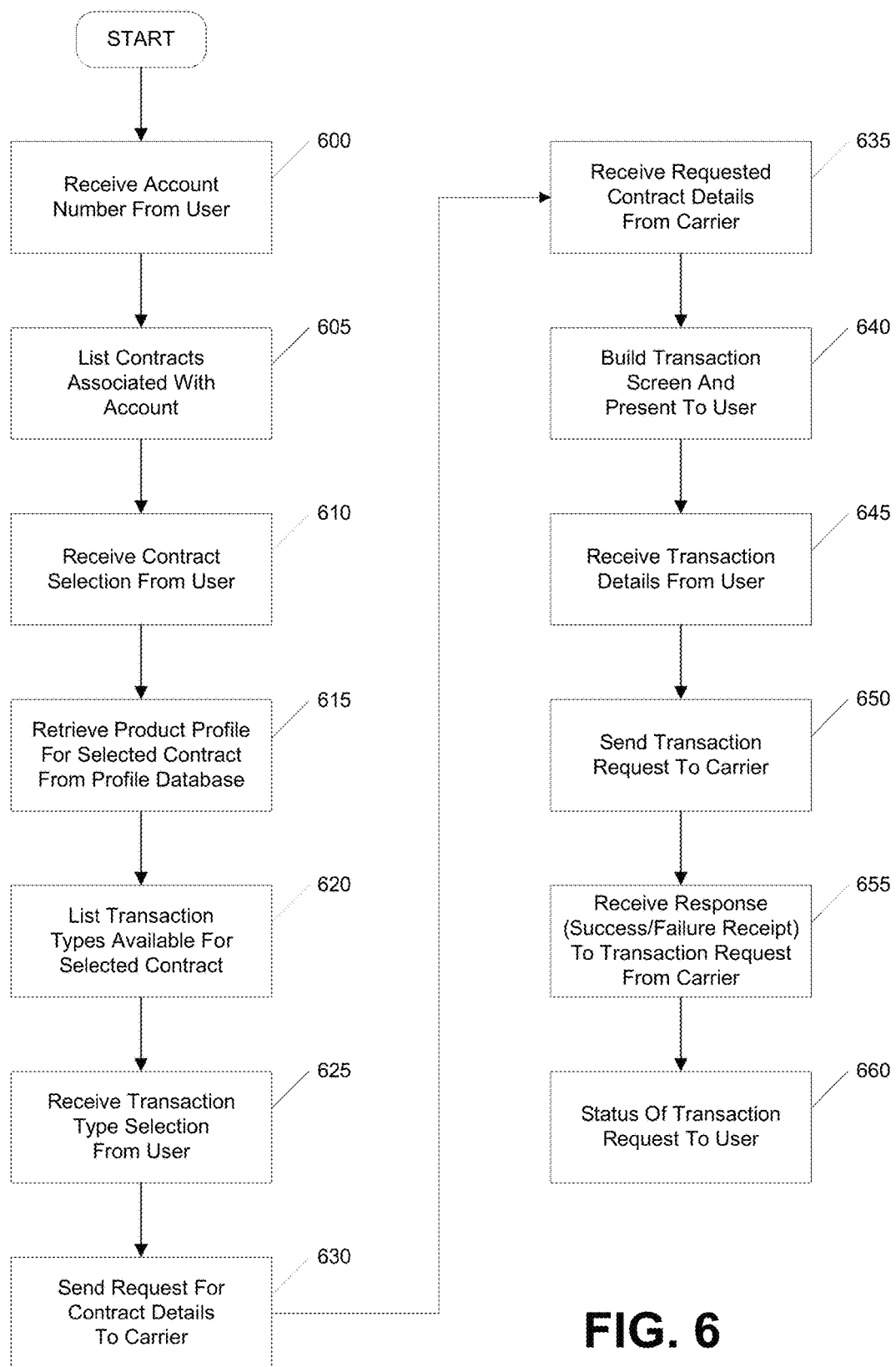
FIG. 6 is a flowchart illustrating an example method of processing a contract transaction request according to one or more aspects described herein.

FIG. 6 is a flowchart illustrating receiving and processing an annuity transaction request at the distributor portal (e.g., distributor portal 320 shown in FIG. 3) according to various aspects described herein. As described above, the distributor portal may be associated with an annuity distribution entity, which may operate the distributor portal for facilitating communications between a user of the distributor portal and a carrier (e.g., carrier 310a), such as an annuity issuing entity that has a contract with the user. The process illustrated in FIG. 6 begins at step 600 where the distributor portal receives from a user (e.g., user 305a shown in FIG. 4), which may include a financial advisor or agent associated with an annuity distribution entity and a customer of the entity, the customer itself, or the carrier, a number of an account associated with the user. In at least one arrangement, this account number may be used in a previous authentication step (not show) that distributor portal may have in place to authenticate and authorize the user to initiate step 600. In response to receiving the account number from the user, the distributor portal identifies the account linked with the account number and provides a list of contracts associated with the account in step 605. The list of contracts associated with the identified account may include several different types of contracts, with the different types of contracts being defined by the entity that issues the contracts, such as carrier 310a.

Figure 7:
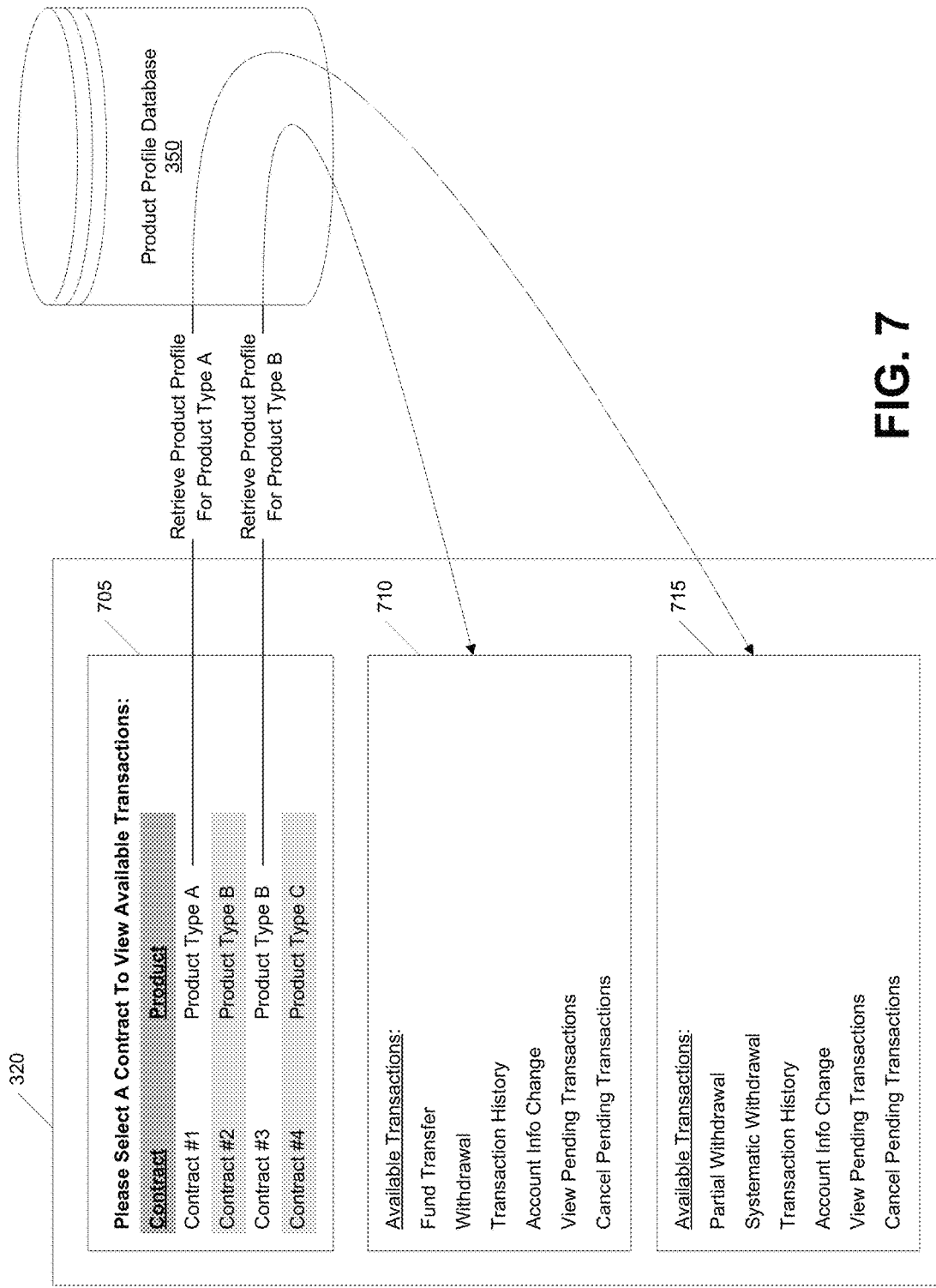
FIG. 7 illustrates an example menu structure and data flow for retrieving information about a contract according to one or more aspects described herein.

The process continues in step 610 with the distributor portal receiving from the user a selection of a contract of the list of contracts provided in step 605. The distributor portal, upon receiving the contract selection, retrieves information about the contract type of the selected contract from a product profile database in step 615. Referring to FIG. 7, in at least one arrangement, the distributor portal retrieves information about the contract type from a product profile database 350, which the distributor portal then uses to generate the list of available transaction types for the selected contract presented to the user in step 620. In step 625, the distributor portal receives a selection of an available transaction type from the user.

After receiving the transaction type selection from the user in step 625, the distributor portal may then send a request for contract details about the selected contract to the carrier in step 630. In at least one arrangement, the distributor portal requests only certain details about the selected contract relevant to the particular type of transaction request selected by the user. In other arrangements, the distributor portal may request all available contract details about the selected contract from the carrier in step 630. In step 635, the distributor portal receives back the requested contract details from the carrier, and then in step 640 the distributor portal builds a transaction details screen (e.g., a graphical user interface) and presents the screen to the user. The building of the transaction screen or user interface in step 640 may occur in a number of different ways, and the particular steps involved in such a process are beyond the scope of the present disclosure. However, the transaction screen/interface presented to the user in step 640 is in a format that allows the user to enter details about the selected transaction that the distributor portal receives from the user in step 645. For example, the distributor portal may receive from the user in step 645 details regarding a change of address of the user, a funds transfer, a funds withdrawal, and the like.

When the distributor portal receives the transaction details from the user in step 645, the distributor portal sends a transaction request to the carrier in step 650. In one or more arrangements, the transaction request sent to the carrier in step 650 is formatted by the distributor portal according to certain rules included in the information retrieved by the distributor portal from the product profile database in step 615. As such, depending on the particular type of contract involved, the transaction request sent to the carrier in step 650 may be in any number of different forms. In step 655, the distributor portal receives a response from the carrier acknowledging the transaction request sent in step 650. Such a response may include, for example, a confirmation receipt or other such notification of acceptance (or rejection) of the transaction request. The process completes with step 660, in which the distributor portal provides the user with a status of the transaction request. For example, upon the initial submission of the transaction request by the user, the distributor portal (assuming that the request is accepted by the carrier in the response received in step 655) may provide the user with a status such as "pending" or "under review."

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

What is claimed is:

1. A system, comprising:
    at least one processor; and
    memory storing computer-readable instructions that, when executed by the at least one processor, cause the system to:
        receive, by a distributor portal provided by the system, an account number from a user of the distributor portal, the account number corresponding to an account of an annuity distribution entity;
        provide, by the distributor portal provided by the system, a list of annuity contracts associated with the account of the annuity distribution entity, the list of annuity contracts including one or more annuity contracts associated with the annuity distribution entity;
        receive, by the distributor portal provided by the system, a selection of an annuity contract included in the list of annuity contracts from the user of the distributor portal;
        after receiving the selection of the annuity contract, retrieve, by the distributor portal provided by the system, product profile information for the annuity contract from a product profile database, the product profile database storing profile information for available transaction requests for one or more annuity products of one or more annuity carriers,
            wherein the available transaction requests for the one or more annuity products of the one or more annuity carriers include a recurring allocation request, a systematic annuity withdrawal request, and a dollar cost averaging request;
        provide, by the distributor portal provided by the system, a list of available annuity transactions for the annuity contract to the user of the distributor portal based on the product profile information for the annuity contract;
        receive, by the distributor portal provided by the system, a selection of a transaction included in the list of available annuity transactions for the annuity contract from the user of the distributor portal;
        after receiving the selection of the transaction, send, by the distributor portal provided by the system, a request for contract details information for the annuity contract to a carrier associated with the annuity contract;
        receive, by the distributor portal provided by the system, the contract details information for the annuity contract from the carrier associated with the annuity contract;
        present, by the distributor portal provided by the system, a transaction user interface to the user of the distributor portal based on the contract details information for the annuity contract;
        receive, by the distributor portal provided by the system, via the transaction user interface, transaction details information from the user of the distributor portal, the transaction details information including information specifying a change to be made to the annuity contract;
        send, by the distributor portal provided by the system, a transaction request to the carrier associated with the annuity contract based on the transaction details information received from the user of the distributor portal,
            wherein sending the transaction request to the carrier associated with the annuity contract based on the transaction details information received from the user of the distributor portal comprises formatting, by the distributor portal provided by the system, the transaction request according to one or more rules included in the product profile information for the annuity contract retrieved by the distributor portal from the product profile database, and
            wherein the one or more rules used in formatting the transaction request are associated with a messaging protocol for processing annuity transactions;

receive, by the distributor portal provided by the system, a response to the transaction request from the carrier associated with the annuity contract; and provide, by the distributor portal provided by the system, status information for the transaction request to the user of the distributor portal based on the response to the transaction request received from the carrier associated with the annuity contract.

2. The system of claim 1, wherein the user of the distributor portal is a financial advisor associated with the annuity distribution entity.

3. The system of claim 1, wherein the profile information stored in the product profile database is received from the one or more annuity carriers by the distributor portal and stored in the product profile database by the distributor portal.

4. The system of claim 3, wherein the distributor portal receives updated product profile information from the one or more annuity carriers on a periodic basis and updates the product profile database based on the updated product profile information.

5. The system of claim 1, wherein the available transaction requests for the one or more annuity products of the one or more annuity carriers further include a funds transfer request, a partial withdrawal request, an account number change request, a rebalancing between accounts request, and an allocation of assets among accounts request.

6. A method, comprising:
receiving, by a distributor portal provided by a computing device, an account number from a user of the distributor portal, the account number corresponding to an account of an annuity distribution entity;
providing, by the distributor portal provided by the computing device, a list of annuity contracts associated with the account of the annuity distribution entity, the list of annuity contracts including one or more annuity contracts associated with the annuity distribution entity;
receiving, by the distributor portal provided by the computing device, a selection of an annuity contract included in the list of annuity contracts from the user of the distributor portal;
after receiving the selection of the annuity contract, retrieving, by the distributor portal provided by the computing device, product profile information for the annuity contract from a product profile database, the product profile database storing profile information for available transaction requests for one or more annuity products of one or more annuity carriers,
    wherein the available transaction requests for the one or more annuity products of the one or more annuity carriers include a recurring allocation request, a systematic annuity withdrawal request, and a dollar cost averaging request;
providing, by the distributor portal provided by the computing device, a list of available annuity transactions for the annuity contract to the user of the distributor portal based on the product profile information for the annuity contract;
receiving, by the distributor portal provided by the computing device, a selection of a transaction included in the list of available annuity transactions for the annuity contract from the user of the distributor portal;
after receiving the selection of the transaction, sending, by the distributor portal provided by the computing device, a request for contract details information for the annuity contract to a carrier associated with the annuity contract;
receiving, by the distributor portal provided by the computing device, the contract details information for the annuity contract from the carrier associated with the annuity contract;
presenting, by the distributor portal provided by the computing device, a transaction user interface to the user of the distributor portal based on the contract details information for the annuity contract;
receiving, by the distributor portal provided by the computing device, via the transaction user interface, transaction details information from the user of the distributor portal, the transaction details information including information specifying a change to be made to the annuity contract;
sending, by the distributor portal provided by the computing device, a transaction request to the carrier associated with the annuity contract based on the transaction details information received from the user of the distributor portal,
    wherein sending the transaction request to the carrier associated with the annuity contract based on the transaction details information received from the user of the distributor portal comprises formatting, by the distributor portal provided by the computing device, the transaction request according to one or more rules included in the product profile information for the annuity contract retrieved by the distributor portal from the product profile database, and
    wherein the one or more rules used in formatting the transaction request are associated with a messaging protocol for processing annuity transactions;
receiving, by the distributor portal provided by the computing device, a response to the transaction request from the carrier associated with the annuity contract; and
providing, by the distributor portal provided by the computing device, status information for the transaction request to the user of the distributor portal based on the response to the transaction request received from the carrier associated with the annuity contract.

7. The method of claim 6, wherein the user of the distributor portal is a financial advisor associated with the annuity distribution entity.

8. The method of claim 6, wherein the profile information stored in the product profile database is received from the one or more annuity carriers by the distributor portal and stored in the product profile database by the distributor portal.

9. The method of claim 8, wherein the distributor portal receives updated product profile information from the one or more annuity carriers on a periodic basis and updates the product profile database based on the updated product profile information.

10. The method of claim 6, wherein the available transaction requests for the one or more annuity products of the one or more annuity carriers further include a funds transfer request, a partial withdrawal request, an account number change request, a rebalancing between accounts request, and an allocation of assets among accounts request.

11. One or more non-transitory computer-readable media storing computer-readable instructions that, when executed by at least computer, cause the at least one computer to:
receive, by a distributor portal provided by the at least one computer, an account number from a user of the distributor portal, the account number corresponding to an account of an annuity distribution entity;

provide, by the distributor portal provided by the at least one computer, a list of annuity contracts associated with the account of the annuity distribution entity, the list of annuity contracts including one or more annuity contracts associated with the annuity distribution entity;

receive, by the distributor portal provided by the at least one computer, a selection of an annuity contract included in the list of annuity contracts from the user of the distributor portal;

after receiving the selection of the annuity contract, retrieve, by the distributor portal provided by the at least one computer, product profile information for the annuity contract from a product profile database, the product profile database storing profile information for available transaction requests for one or more annuity products of one or more annuity carriers, wherein the available transaction requests for the one or more annuity products of the one or more annuity carriers include a recurring allocation request, a systematic annuity withdrawal request, and a dollar cost averaging request;

provide, by the distributor portal provided by the at least one computer, a list of available annuity transactions for the annuity contract to the user of the distributor portal based on the product profile information for the annuity contract;

receive, by the distributor portal provided by the at least one computer, a selection of a transaction included in the list of available annuity transactions for the annuity contract from the user of the distributor portal;

after receiving the selection of the transaction, send, by the distributor portal provided by the at least one computer, a request for contract details information for the annuity contract to a carrier associated with the annuity contract;

receive, by the distributor portal provided by the at least one computer, the contract details information for the annuity contract from the carrier associated with the annuity contract;

present, by the distributor portal provided by the at least one computer, a transaction user interface to the user of the distributor portal based on the contract details information for the annuity contract;

receive, by the distributor portal provided by the at least one computer, via the transaction user interface, transaction details information from the user of the distributor portal, the transaction details information including information specifying a change to be made to the annuity contract;

send, by the distributor portal provided by the at least one computer, a transaction request to the carrier associated with the annuity contract based on the transaction details information received from the user of the distributor portal, wherein sending the transaction request to the carrier associated with the annuity contract based on the transaction details information received from the user of the distributor portal comprises formatting, by the distributor portal provided by the at least one computer, the transaction request according to one or more rules included in the product profile information for the annuity contract retrieved by the distributor portal from the product profile database, and wherein the one or more rules used in formatting the transaction request are associated with a messaging protocol for processing annuity transactions;

receive, by the distributor portal provided by the at least one computer, a response to the transaction request from the carrier associated with the annuity contract; and provide, by the distributor portal provided by the at least one computer, status information for the transaction request to the user of the distributor portal based on the response to the transaction request received from the carrier associated with the annuity contract.

12. The one or more non-transitory computer-readable media of claim 11, wherein the user of the distributor portal is a financial advisor associated with the annuity distribution entity.

13. The one or more non-transitory computer-readable media of claim 11, wherein the profile information stored in the product profile database is received from the one or more annuity carriers by the distributor portal and stored in the product profile database by the distributor portal.

14. The one or more non-transitory computer-readable media of claim 13, wherein the distributor portal receives updated product profile information from the one or more annuity carriers on a periodic basis and updates the product profile database based on the updated product profile information.

* * * * *